US008688986B2

(12) United States Patent
Kohlenberg et al.

(10) Patent No.: US 8,688,986 B2
(45) Date of Patent: Apr. 1, 2014

(54) METHOD FOR EXCHANGING STRONG ENCRYPTION KEYS BETWEEN DEVICES USING ALTERNATE INPUT METHODS IN WIRELESS PERSONAL AREA NETWORKS (WPAN)

(75) Inventors: Tobias Max Kohlenberg, Portland, OR (US); Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1513 days.

(21) Appl. No.: 11/646,013

(22) Filed: Dec. 27, 2006

(65) Prior Publication Data

US 2008/0162937 A1 Jul. 3, 2008

(51) Int. Cl.
*H04L 29/06* (2006.01)

(52) U.S. Cl.
USPC ........... 713/169; 713/171; 380/277; 380/278; 380/279

(58) Field of Classification Search
USPC ........... 713/176, 169, 171; 380/255, 277–279
See application file for complete search history.

(56) References Cited

U.S. PATENT DOCUMENTS

| | | | |
|---|---|---|---|
| 6,694,431 B1 * | 2/2004 | Binding et al. | 713/160 |
| 7,043,633 B1 * | 5/2006 | Fink et al. | 713/162 |
| 2002/0131592 A1 * | 9/2002 | Hinnant | 380/46 |
| 2002/0186846 A1 * | 12/2002 | Nyberg et al. | 380/273 |
| 2003/0226015 A1 * | 12/2003 | Neufeld et al. | 713/166 |
| 2004/0161111 A1 * | 8/2004 | Sherman | 380/283 |
| 2005/0175216 A1 * | 8/2005 | Bloom et al. | 382/100 |
| 2005/0273609 A1 | 12/2005 | Eronen | |
| 2006/0034456 A1 * | 2/2006 | McGough | 380/30 |
| 2006/0128305 A1 * | 6/2006 | Delalat | 455/41.2 |
| 2006/0161791 A1 * | 7/2006 | Bennett | 713/193 |

(Continued)

FOREIGN PATENT DOCUMENTS

| | | |
|---|---|---|
| CN | 1523807 A | 8/2004 |
| EP | 1450233 A2 | 8/2004 |

(Continued)

OTHER PUBLICATIONS

Prateek, Security Analysis of Voice-over-IP Protocols, 2007, University of Texas at Austin, p. 1-21.*

(Continued)

*Primary Examiner* — Thanhnga B Truong
*Assistant Examiner* — Gregory Lane
(74) *Attorney, Agent, or Firm* — Barnes & Thornburg LLP

(57) ABSTRACT

A method for exchanging strong encryption keys between devices using alternate input methods. At least two devices that want to communicate with one another are set in key exchange mode. The at least two devices are to communicate with one another using a short range radio or personal area network. The at least two devices negotiate with one another to determine which of the at least two devices will generate an encryption key, wherein device A represents the negotiated device and device B represents the non-negotiated device. Device A generates the encryption key and transmits the encryption key to device B using an out-of band transmission channel. The out-of-band transmission channel may be transmitting the encryption key via audio tones. A validation process determines whether the transmission of the encryption key via the out-of-band transmission channel was successful. If the encryption key has been successfully validated, the at least two devices are enabled to automatically accept communications between them over the short range radio or personal area network.

19 Claims, 3 Drawing Sheets

(a)

(b)

(56) References Cited

U.S. PATENT DOCUMENTS

| | | | | |
|---|---|---|---|---|
| 2006/0205388 | A1* | 9/2006 | Semple et al. | 455/411 |
| 2007/0106892 | A1* | 5/2007 | Engberg | 713/168 |
| 2007/0204163 | A1* | 8/2007 | Andrews et al. | 713/176 |
| 2007/0229678 | A1* | 10/2007 | Barrus et al. | 348/231.3 |
| 2007/0233860 | A1* | 10/2007 | Lillie et al. | 709/225 |
| 2008/0046728 | A1* | 2/2008 | Lyle | 713/169 |
| 2008/0070501 | A1* | 3/2008 | Wyld | 455/41.2 |
| 2008/0123849 | A1* | 5/2008 | Samayamantry et al. | 380/255 |

FOREIGN PATENT DOCUMENTS

| | | | |
|---|---|---|---|
| JP | 11-252069 | A | 9/1999 |
| JP | 2004-254320 | A | 9/2004 |
| JP | 2006-108886 | A | 4/2006 |
| JP | 2006-190051 | A | 7/2006 |
| JP | EP 1940072 | * | 7/2008 |
| KR | EP1742464 | * | 1/2007 |
| WO | 02/056536 | A1 | 7/2002 |
| WO | 02056536 | A1 | 7/2002 |

OTHER PUBLICATIONS

PALM: Support Knowledge Library; Bluetooth Pairing: definition and overview, Sep. 26, 2005, Article ID 14817, http://kb.palmone.com/SRVS/CGI-BIN/WEBCGI.EXE?New.Kb=PalmSupportKB,ts=Palm_External2001,case=obj(14817).

Bluetooth—An Overview; Establishing Network Connections Apr. 17, 2004, http://www.swedetrack.com/images/bluet14.htm.

Bluetooth—An Overview; What is Bluetooth,Apr. 17, 2004, http://www.swedetrack.com/images/bluet00.htm.

Bluetooth—An Overview; What about Bluetooth's security?, Apr. 17, 2004,http://www.swedetrack.com/images/bluet08.htm.

Office Action Received for Korean Patent Application No. 10-2007-137949 mailed on Jan. 30, 2010, 4 pages of English Translation and 3 pages of Office Action.

Office Action Received for Chinese Patent Application No. 200710306601.5 mailed on Jun. 12, 2010, 6 pages of Office Action and 8 pages of English Translation.

Office Action Received for Chinese Patent Application No. 200710306601.5, mailed on Mar. 8, 2011, 5 pages of Office Action and 3 pages of English Translation.

Office Action Received for Japanese Patent Application No. 2007-332027, mailed on Jan. 4, 2011, 6 pages of Office Action and 5 pages of English Translation.

European Search report received for European Patent Application No. 07254928.0, mailed on Aug. 5, 2009, 6 pages.

Office Action received in Chinese Patent Application No. 200710306601.5, mailed Aug. 25, 2011, 15 pages of Office Action including 10 pages of unofficial English translation.

Official Communication received for European Patent Application No. 07254928.0, mailed on Mar. 21, 2013, 6 pages.

Office Action received for Chinese Patent Application No. 200710306601.5, mailed on Jun. 13, 2013, 5 pages of Chinese Office Action and 8 pages of unofficial English translation.

Official Communication received for Chinese Patent Application No. 200710306601.5, mailed on Nov. 14, 2013, 9 pages of Chinese Official Communication and 15 pages of unofficial English translation.

* cited by examiner

METHOD FOR EXCHANGING STRONG ENCRYPTION KEYS BETWEEN DEVICES USING ALTERNATE INPUT METHODS IN WIRELESS PERSONAL AREA NETWORKS (WPAN)

BACKGROUND OF THE INVENTION

1. Field of the Invention

The present invention is generally related to the field of mobile security. More particularly, the present invention is related to a method for exchanging strong encryption keys between mobile devices using alternate data transfer methods in wireless personal area networks (WPAN).

2. Description

For local, short-range, and personal area networks, Bluetooth and the emerging UWB (Ultra-Wide-Band) technologies remain the leading protocols in the market today. It is estimated that there are over one billion Bluetooth-enable handhelds in worldwide use today.

One of the most challenging aspects of short-range radiolink technologies, such as Bluetooth, is security. For example, with Bluetooth, link and encryption keys are derived from a PIN (personal identification number)/passkey code that users, of the devices that are to communicate with one another, must physically/manually enter during device-pairing. With devices that enable entry of the PIN/passkey code via an interface device, such as a keypad, the PIN/passkey code may be a user or manufacturer-selected code that must be entered on the spot. Devices that accept user selected PIN/passkey codes that must be entered on the spot may include, but are not limited to, cell phones and laptop computers. Devices that do not have an interface for changing the PIN/passkey code on the device may have a PIN/passkey that is unchangeable. In other words, the PIN/passkey remains the same and is usually set by the manufacturer. Devices with unchangeable PIN/passkey codes may include, but are not limited to, hands-free headsets and printers.

Often times manufacturers will set the same PIN/passkey on each device of its kind. For example, all hands-free headsets manufactured by XYZ Corporation may all have the PIN 3958, which is not secure because it is known for all XYZ wireless devices of its kind.

The purpose of the PIN/passkey is to enable two or more devices wanting to communicate with one another to discover each other and create an encryption key that enables the devices to join what is called a trusted pair or a trusted piconet. The encryption key is used to protect all of the information that is to be exchanged between the devices. The problem that exists today is that the encryption key is being created over the same channel in which the encryption key is to be used to protect communications between the devices, thereby making it vulnerable for attack. In other words, when there are other devices within communication range of a device having the same PIN/passkey in which communications are not desired, these undesirable devices may derive the encryption key, making the desired communicating devices vulnerable to attack.

Currently, the strength of security for wireless USB (Universal Serial Bus), WLAN (Wireless Local Area Networks), short-range radio networks, and personal area networks, such as, for example, Bluetooth and UWB, is based on the strength (Entropy, randomness, and size) of the PIN/passkey code. The more random and the longer the size of the PIN/passkey code, the stronger the PIN/passkey code. Users of devices in which the user has to enter the PIN/passkey code do not want to enter a PIN/passkey that is long in length, thereby jeopardizing the security of the trusted pair or trusted group. For example, users are more comfortable entering a 4-character or less PIN/passkey, but are very uncomfortable with having to enter a PIN/passkey of a greater length than four digits. In fact, with regards to the typical users of such devices, the shorter the PIN, the better.

Thus, what is needed is a method for enabling an out-of-band communications channel, separate and distinct from the communication channel in which communications between the devices are to be protected, to exchange the encryption key for wireless short-range radio and personal area networks, such as, but not limited to, Bluetooth and UWB. What is further needed is a method for enabling transmission of a longer PIN without requiring the user to enter the PIN.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
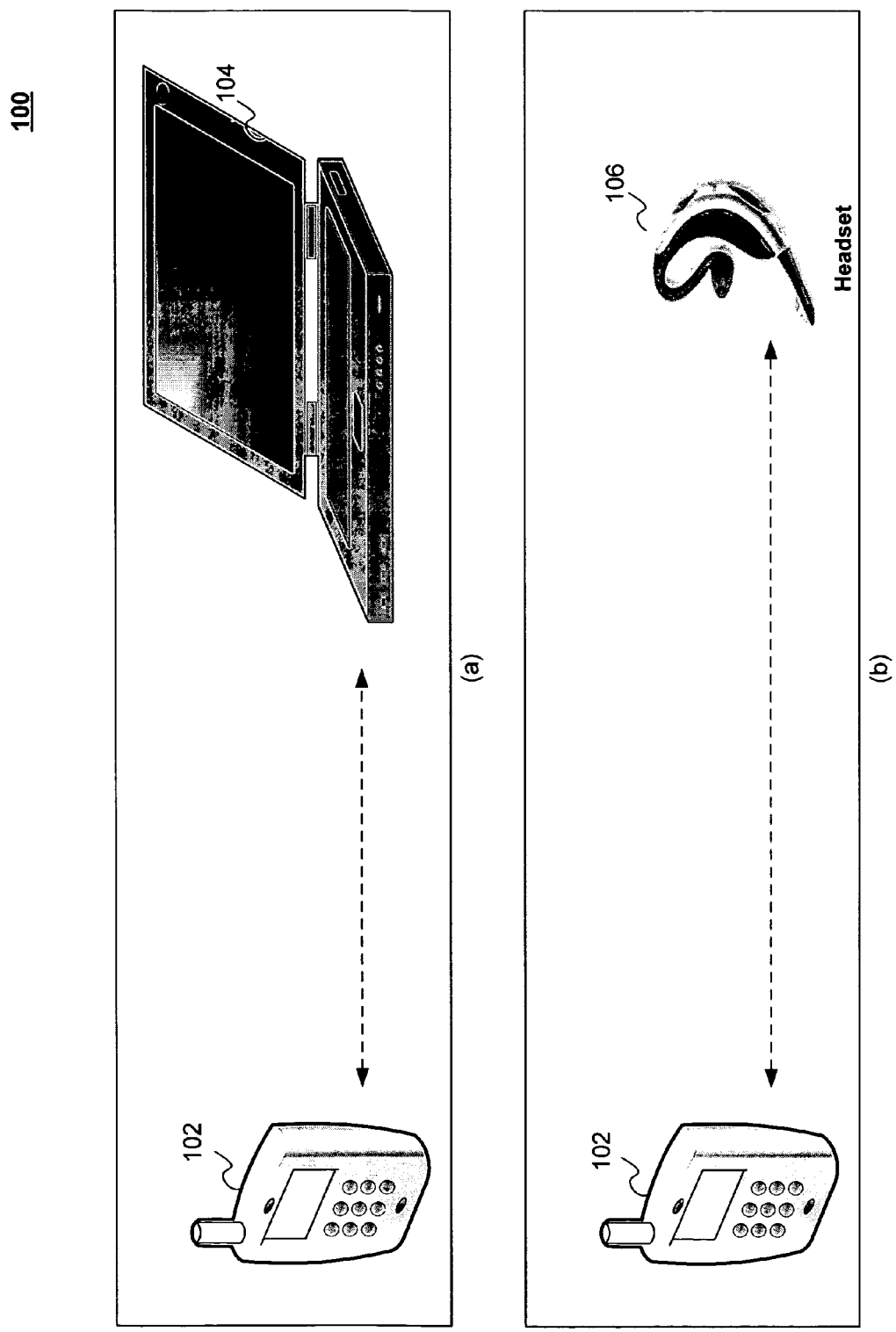
FIGS. 1a and 1b are diagrams illustrating exemplary devices that may communicate using a wireless protocol for local, short-range, and personal area networks that may require device pairing according to an embodiment of the present invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to methods for exchanging strong encryption keys between devices that operate within a short-range radio or personal area network by using alternate data transfer mechanisms to exchange information for use in encryption and authentication. In one embodiment, this may be accomplished by using audio tones to exchange the encryption key during device pairing. In another embodiment, this may be accomplished by displaying a picture with the encryption key embedded in the picture to exchange the encryption key during device pairing. Using an alternate data transfer mechanism (also referred to as an out-of-band encryption key exchange) enhances device security by enabling stronger encryption keys to be employed (that is, encryption keys of a much greater length than is feasible for a human to manually enter into the device). Embodiments of the present invention use speakers, microphones, displays, and cameras that are already available in the devices that agree to communicate with each other, and therefore, do not require any additional hardware to be built or placed on the devices to enable the stronger security.

Although embodiments of the present invention are described with respect to Bluetooth devices, the invention is not limited to Bluetooth. Those skilled in the relevant art(s) will know that other types of wireless protocols for local, short-range, and personal area networks, including Wireless USB and WLAN networks, which require device pairing are equally applicable. For example, embodiments of the present invention may also be applicable to UWB protocols as well.

The present invention is also described with respect to communications between two devices. This is done for illustrative purposes only. One skilled in the relevant art(s) would know that the teachings of embodiments of the present invention may also extend to communications between more than two devices. For example, embodiments of the present invention may also be applicable to a plurality of Bluetooth devices that communicate using a piconet formation.

Note that throughout this Specification, the terms "key exchange mode" and "pairing mode" may be used interchangeably.

FIGS. 1a and 1b are diagrams illustrating exemplary devices that may communicate using a wireless protocol for local, short-range, and personal area networks that may require device pairing according to an embodiment of the present invention. FIG. 1a illustrates a cell phone 102 communicating with a laptop computer 104 using a wireless protocol for local, short-range, or personal area networks that require device pairing. Both cell phone 102 and laptop computer 104 include a microphone (not explicitly shown), a speaker (not explicitly shown), and a display. Thus, the hardware of cell phone 102 and laptop computer 104 enable the use of an out-of-band encryption key exchange using audio tones for device-to-device pairing.

Cell phone 102 may also include a camera. The hardware component of a camera for cell phone 102 and displays for both cell phone 102 and laptop computer 104 enable the use of an out-of-band encryption key exchange using video for device-to-device pairing.

FIG. 1b illustrates cell phone 102 communicating with a hands-free headset 106. As previously indicated, a hands-free headset does not have an interface for changing the PIN/passkey. Both cell phone 102 and hands-free headset 106 both include a microphone and a speaker. Thus, with the present invention, hands-free headset 106 may change its encryption key using the microphones and speakers. In this instance, cell phone 102 and hands-free headset 106 may form a trusted pair using audio tones for an out-of-band encryption key exchange during pairing.

Although FIGS. 1a and 1b illustrate cell phones, laptops, and hands-free headsets as small form factor devices for pairing, these devices are for illustration purposes only. Other devices that may use a wireless protocol for local, short-range, and personal area networks that may require device pairing are also applicable. Such devices may include, but are not limited to, smartphones, ultra-mobile devices, printers, wireless projectors, desktop PCs, etc.

Figure 2:
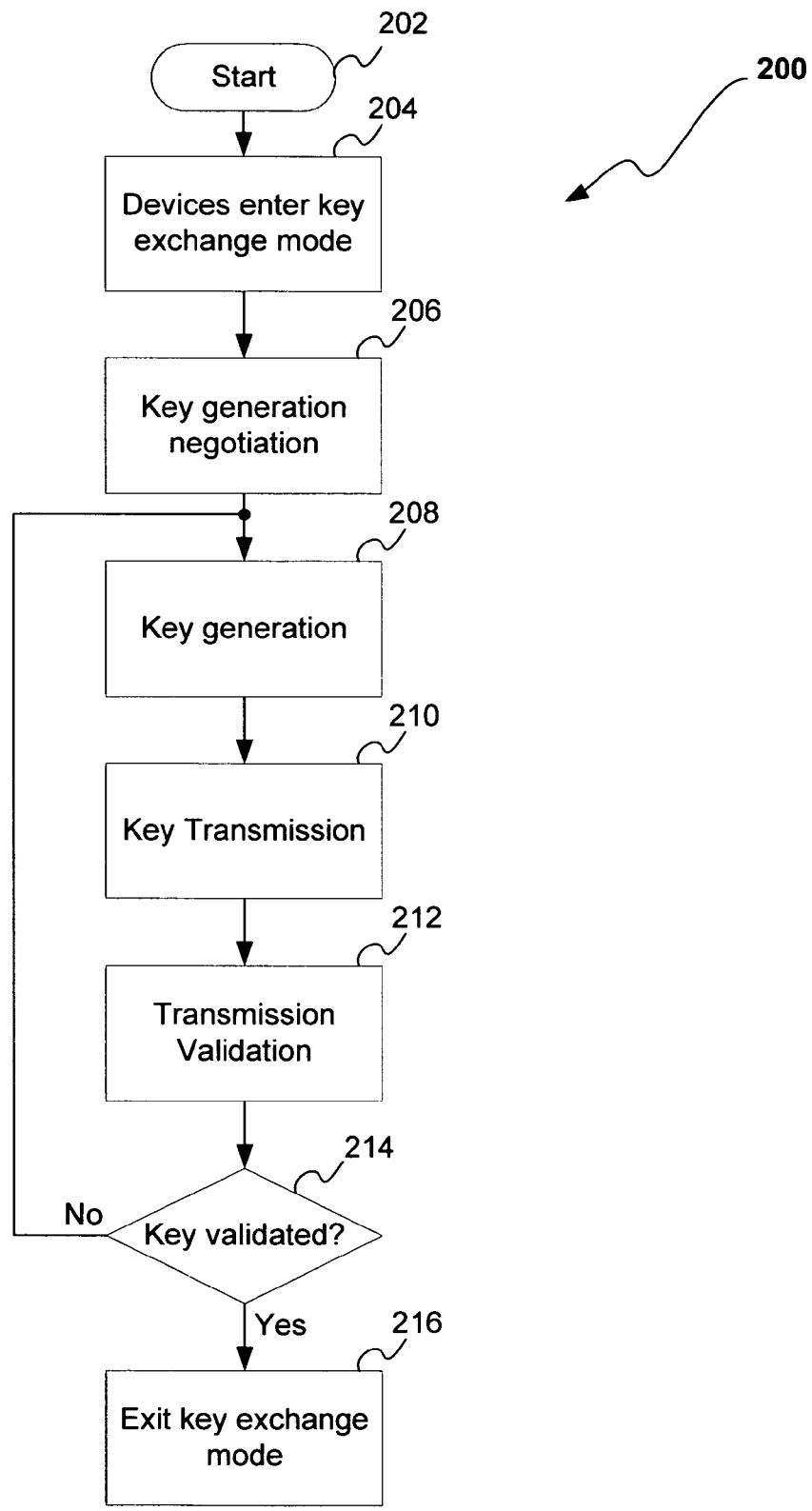
FIG. 2 is a flow diagram describing an exemplary method for exchanging strong encryption keys between devices using alternate input methods according to an embodiment of the present invention.

FIG. 2 is a flow diagram describing an exemplary method for exchanging strong encryption keys between devices using alternate input methods according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, the devices that are to communicate with one another are placed in key exchange mode (also referred to as "pairing mode"). For example, with a cell phone, one may first enter a configuration mode to select or say "pairing mode." With a headset, one may hold the power button in the down position for an extended period of time to enter the pairing mode. Thus, the process for entering the exchange mode may be different for each device, and is well documented by each manufacturer of a device. The process then proceeds to block 206.

In block 206, the devices negotiate as to who will generate the encryption key. This may be a manual or automated process. In one embodiment, the device with more processing power may initiate the process and drive the negotiation. For example, returning to FIG. 1a, when cell phone 102 and laptop 104 negotiate the generation of the key, laptop 104, which has more processing power than cell phone 102, may initiate the process and drive the negotiation. In FIG. 1b, when cell phone 102 and headset 106 negotiate the generation of the encryption key, cell phone 102, which has more processing power, may initiate the process and drive the negotiation. In another embodiment of the present invention, the device that drives the negotiation and generates the encryption key may not be based on processing power, but may be based on the device that initiated the communication. Yet in another embodiment of the present invention, the device to drive the negotiation and generate the encryption key may be the device that offers first to generate the key. The process then proceeds to block 208.

In block 208, the encryption key is generated by the device that negotiated to generate the key. For simplicity, this device is referred to hereinafter as device A. Background noise may be used as a random seed to be used to generate the encryption key. The random seed may be input into a random number generator to obtain the encryption key. The process then proceeds to block 210.

In block 210, the encryption key is transmitted from device A to device B (the device to receive the encryption key) via an out-of-band transmission channel. In one embodiment, the encryption key is transmitted from device A to device B using a high speed audio transmission. In other words, the encryption key is transmitted in the form of audio tones. The audio tones allow for a much longer encryption key (encryption key>>16 characters), and therefore, provides an encryption key with much stronger security.

In another embodiment, the encryption key is transmitted via a video display. Device A creates a picture with the encryption key embedded in the picture. The encryption key is not visible to the human eye, but can be deciphered using software that is resident on both device A and device B. Device A presents the picture on its display. Device B, which includes a camera, captures a picture of the display using the camera and then interprets the encryption key embedded in the picture using software logic.

In block 212, the encrypted key exchange is validated via a wireless protocol, such as, but not limited to, Bluetooth, UWB, or another wireless protocol that requires pairing. The process then proceeds to decision block 214.

In decision block 214, it is determined whether the encryption key exchange was successfully validated. If it is determined that the encryption key was not successfully validated, the process of generating an encryption key (block 208), transmitting the encryption key (block 210) and validating the encryption key (block 212) is repeated until the validation process is successful.

Returning to decision block 214, if it is determined that the encryption key was successfully validated, the process proceeds to block 216. In block 216, a trusted pair has been established, and the process ends by enabling the devices to exit the key exchange mode. Once the encryption key has been successfully exchanged, the devices may automatically accept communications between them without having to discover or authenticate one another in a secure manner.

Figure 3:
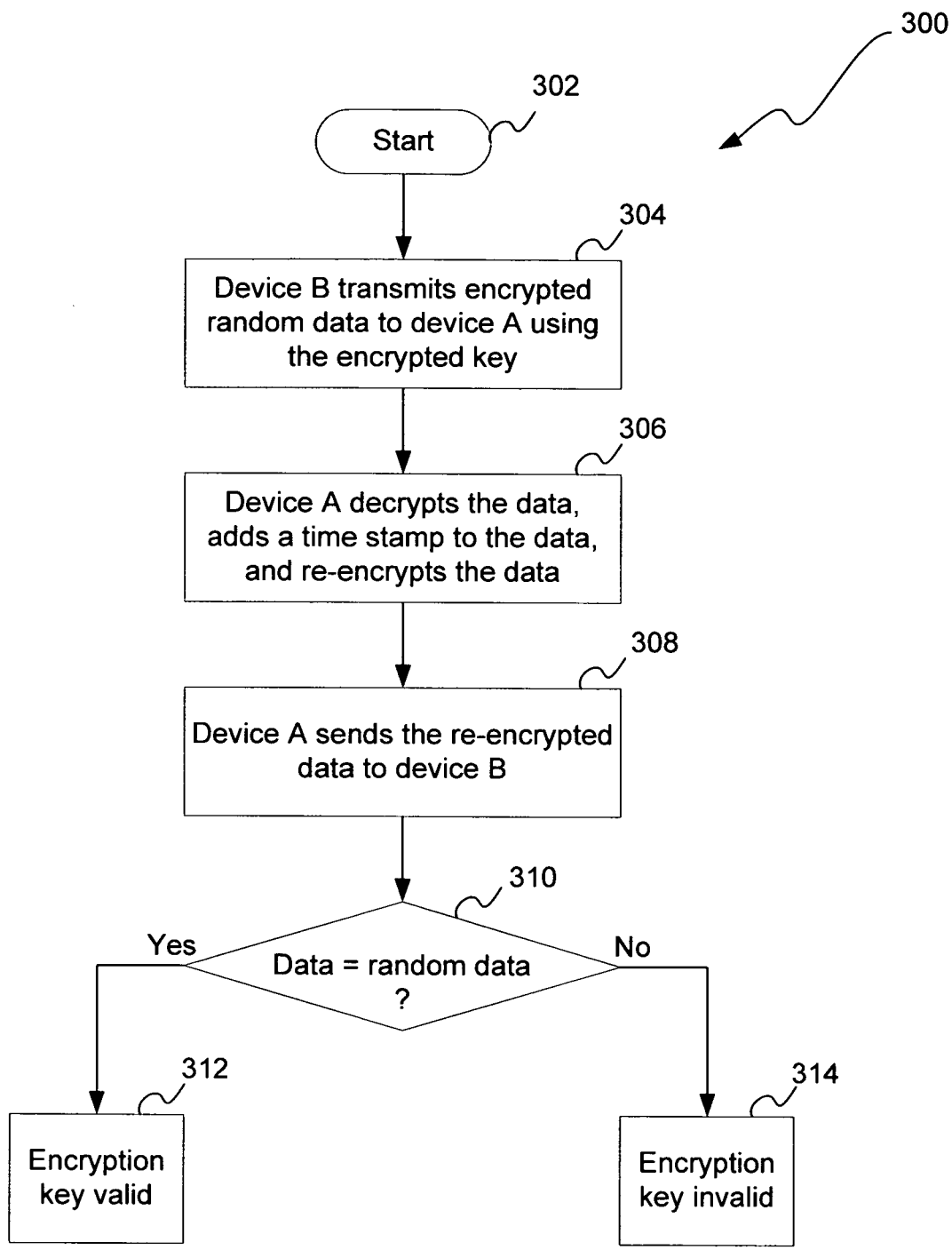
FIG. 3 is a flow diagram illustrating an exemplary method for validating an encryption key exchange between devices using alternate input methods according to an embodiment of the present invention.

FIG. 3 is a flow diagram 300 illustrating an exemplary method for validating an encryption key exchange between devices using alternate input methods according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, device B, after receiving the encryption key, transmits encrypted random data to device A via a wireless transmission, such as, for example, Bluetooth, UWB, or any other short range wireless protocol that requires pairing using the encrypted key. The process then proceeds to block 306.

In block 306, device A decrypts the data, adds a time stamp to the data, and re-encrypts the data. The process then proceeds to block 308.

In block 308, device A sends the re-encrypted data back to device B. If, in decision block 310, device B receives the random data back that it sent to device A in block 304 with the time stamp, then the encryption key is validated (block 312). Returning to decision block 310, if device B does not receive the random data back with the time stamp, then the encryption key is not validated (block 314).

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set-top boxes, cellular telephones, and other electronic devices that each includes one or more processors, a storage medium readable by the one or more processors (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, multi-core processor systems and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for secure communication comprising:
setting at least two devices that want to communicate with one another in key exchange mode, wherein the at least two devices are to communicate over an in-bound transmission channel, wherein the at least two devices negotiate with one another to determine which of the at least two devices will generate an encryption key by determining which of the at least two devices comprises more processing power, wherein device A comprises the negotiated device based on having more processing power than device B;
enabling device A to
generate the encryption key using audible background noise as a random seed; and
transmit the encryption key to device B using audio tones via an out-of-band audio transmission channel;
determining whether the encryption key has been successfully validated; and if the encryption key has been successfully validated, enabling the at least two devices to automatically accept communications between them over the inbound transmission channel.

2. The method of claim 1, wherein the audio tones enable the encryption key to be of a length greater than four (4) characters.

3. The method of claim 1, wherein the audio tones enable the encryption key to be of a length greater than sixteen (16) characters.

4. The method of claim 1, wherein determining whether the encryption key has been successfully validated comprises:
   after receiving the encryption key, transmitting, by device B, encrypted random data to device A using the encryption key via a wireless transmission that requires pairing; and
   receiving, by device B, data back from device A, wherein device A, after receiving the encrypted random data from device B, decrypts the data, adds a time stamp to the random data, and re-encrypts the random data with the time stamp;
   wherein if the data received back from device A does not include the random data sent to device A by device B and the time stamp, the encryption key is invalid and wherein if the data received back from device A does include the random data sent to device A by device B and the time stamp, the encryption key is valid.

5. The method of claim 1, wherein if the encryption is not validated, the method further comprising repeating the process of enabling device A to generate the encryption key and to transmit the encryption key to device B using an out-of-band transmission channel; and determining whether the encryption key has been validated.

6. The method of claim 1, wherein the in-bound transmission channel comprises one of a local, short range, or personal area network.

7. An article comprising:
   a non-transitory storage medium having a plurality of machine accessible instructions,
   wherein when the machine accessible instructions are executed by a processor, the machine accessible instructions provide for:
   setting at least two devices that want to communicate with one another in key exchange mode, wherein the at least two devices are to communicate using a short-range radio or personal area network, wherein the at least two devices negotiate with one another to determine which of the at least two devices will generate an encryption key by determining which of the at least two devices first offers to generate the encryption key, wherein device A comprises the negotiated device based on first offering to generate the encryption key and device B comprises the non-negotiated device;
   enabling device A to
   generate the encryption key using audible background noise as a random seed; and
   transmit the encryption key to device B using audio tones via an out-of-band audio transmission channel; determining whether the encryption key has been successfully validated; and if the encryption key has been successfully validated, enabling the at least two devices to automatically accept communications between them over the short range radio network or the personal area network.

8. The article of claim 7, wherein the audio tones enable the encryption key to be of a length greater than four (4) characters.

9. The article of claim 7, wherein the audio tones enable the encryption key to be of a length greater than sixteen (16) characters.

10. The article of claim 7, wherein instructions for determining whether the encryption key has been successfully validated comprises instructions for:
    after receiving the encryption key, transmitting, by device B, encrypted random data to device A using the encryption key via a wireless transmission that requires pairing; and
    receiving, by device B, data back from device A, wherein device A, after receiving the encrypted random data from device B, decrypts the data, adds a time stamp to the random data, and re-encrypts the random data with the time stamp;
    wherein if the data received back from device A does not include the random data sent to device A by device B and the time stamp, the encryption key is invalid and wherein if the data received back from device A does include the random data sent to device A by device B and the time stamp, the encryption key is valid.

11. The article of claim 7, wherein if the encryption is not validated, the article further comprising instructions for repeating the process of enabling device A to generate the encryption key and to transmit the encryption key to device B using an out-of-band transmission channel; and determining whether the encryption key has been validated.

12. A system for secure communications comprising:
    at least two devices capable of communicating with one another via a local, short-range, or personal area network, wherein the at least two devices to negotiate as to which device will generate an encryption key, wherein the negotiated device (i) to generate the encryption key using audible background noise as a random seed and (ii) to transmit the encryption key to the non-negotiated device using audio tones via an out-of band audio transmission channel, the non-negotiated device to transmit random data to the negotiated device using the encryption key and the negotiated device to transmit return data back to the non-negotiated device to determine whether the encryption key is valid, wherein the return data transmitted by the negotiated device comprises the random data received from the non-negotiated device and a time stamp encrypted using the encryption key.

13. The system of claim 12, wherein the negotiated device comprises the device of the at least two devices having more processing power.

14. The system of claim 12, wherein the negotiated device comprises the device that initiated the communication of the at least two devices.

15. The system of claim 12, wherein the negotiated device comprises the device that offers first to generate the encryption key of the at least two devices.

16. One or more non-transitory machine readable media comprising a plurality of instructions stored thereon, which in response to execution by a computing device, cause the computing device to:
    communicate, in a key exchange mode, with another computing device via an in-bound transmission channel;
    negotiate with the another computing device to determine which device will generate an encryption key based on a determination of which of the devices comprises the more processing power;
    generate the encryption key using audible background noise as a random seed in response to the determination that the computing device comprises more processing power;

transmit the encryption key to the another computing device as audio tones via an out-of-band audio transmission channel;

determine whether the encryption key has been successfully validated; and enable the computing device to automatically accept communications from the another computing device over the in-bound transmission channel in response to the determination that the encryption key has been successfully validated.

17. The one or more non-transitory machine readable media of claim 16, wherein to determine whether the encryption key has been successfully validated comprises to:

receive, subsequent to transmission of the encryption key, encrypted random data from the another computing device via a wireless transmission that requires pairing, the encrypted random data comprises random data encrypted with the encryption key;

decrypt the encrypted random data received from the another computing device with the encryption key to obtain the random data;

add a time stamp to the random data;

re-encrypt the random data with the encryption key, the re-encrypted random data includes the time stamp; and transmit the re-encrypted random data that includes the time stamp to the another computing device.

18. The one or more non-transitory machine readable media of claim 16, wherein the plurality of instructions further cause the computing device to:

regenerate the encryption key using audible background noise as the random seed in response to a determination that the encryption key is not validated;

transmit the regenerated encryption key to the another computing device as audio tones via the out-of-band audio transmission channel; and determine whether the regenerated encryption key has been successfully validated.

19. The one or more non-transitory machine readable media of claim 16, wherein the in-bound transmission channel comprises one of a local, short range, or personal area network.

* * * * *